(12) United States Patent
Fay

(10) Patent No.: US 11,812,083 B2
(45) Date of Patent: Nov. 7, 2023

(54) TECHNIQUES FOR PUSHING PERSONALIZED STOREFRONT ADS USING DIGITAL TV

(71) Applicant: Sony Corporation, Tokyo (JP)

(72) Inventor: Luke Fay, San Diego, CA (US)

(73) Assignee: Sony Corporation, Tokyo (JP)

( * ) Notice: Subject to any disclaimer, the term of this patent is extended or adjusted under 35 U.S.C. 154(b) by 37 days.

(21) Appl. No.: 16/791,751

(22) Filed: Feb. 14, 2020

(65) Prior Publication Data
US 2021/0258625 A1    Aug. 19, 2021

(51) Int. Cl.
| | | |
|---|---|---|
| *H04N 21/81* | (2011.01) | |
| *H04N 21/2668* | (2011.01) | |
| *H04N 21/214* | (2011.01) | |
| *H04N 21/414* | (2011.01) | |
| *H04N 21/236* | (2011.01) | |

(52) U.S. Cl.
CPC ..... *H04N 21/2668* (2013.01); *H04N 21/2143* (2013.01); *H04N 21/236* (2013.01); *H04N 21/41407* (2013.01); *H04N 21/812* (2013.01)

(58) Field of Classification Search
CPC .................................................. H04N 21/812
See application file for complete search history.

(56) References Cited

U.S. PATENT DOCUMENTS

| | | | | |
|---|---|---|---|---|
| 8,806,530 | B1* | 8/2014 | Izdepski | H04N 21/4126 725/141 |
| 2005/0286421 | A1* | 12/2005 | Janacek | H04W 4/029 370/231 |
| 2012/0041823 | A1* | 2/2012 | Khan | G06Q 30/0267 705/14.64 |
| 2014/0143060 | A1* | 5/2014 | Fernandez | H04W 4/021 705/14.58 |
| 2016/0073347 | A1* | 3/2016 | Michaud | H04W 4/60 370/252 |
| 2018/0033045 | A1* | 2/2018 | Flynn | H04W 4/025 |
| 2018/0310154 | A1* | 10/2018 | Cronholm | H04W 52/0229 |
| 2019/0116017 | A1* | 4/2019 | Petruzzelli | H04L 67/02 |

OTHER PUBLICATIONS

"RFC 4033, DNS Security Introduction and Requirements," Arends, R., Austein, R., Larson, M., Massey, D., and S. Rose, Internet Engineering Task Force, Fremont, CA, Mar. 2005.
"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.
"ATSC Standard: ATSC 3.0 Interactive Content (A/344)", May 2, 2019.

(Continued)

*Primary Examiner* — Michael H Hong
(74) *Attorney, Agent, or Firm* — John L. Rogitz

(57) ABSTRACT

Techniques are described for expanding and/or improving the Advanced Television Systems Committee (ATSC) 3.0 television protocol in robustly delivering the next generation broadcast television services. Personalized store front ads are pushed to mobile devices passing stores associated with the ads using layered division multiplexing in an ATSC 3.0 signal.

18 Claims, 4 Drawing Sheets

(56) References Cited

OTHER PUBLICATIONS

"ATSC Standard: ATSC 3.0 Security and Service Protection", Aug. 20, 2019.
"ATSC Standard: ATSC 3.0 System", Sep. 17, 2019.
"ATSC Standard: Signaling, Delivery, Synchronization, and Error Protection (A/331)", Jun. 19, 2019.
"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.
"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.
"RFC 5289, TLS Elliptic Curve Cipher Suites with SHA-256/384 and AES Galois Counter Mode (GCM)," E. Rescorla, Internet Engineering Task Force, Fremont, CA, Aug. 2008.
"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.
"RFC 5652, Cryptographic Message Syntax (CMS)," R. Housley, Internet Engineering Task Force, Fremont, CA, Sep. 2009.
"RFC 5751, Secure/Multipurpose Internet Mail Extensions (S/MIME) Version 3.Message Specification," B. Ramsdell, S. Turner, Internet Engineering Task Force, Fremont, CA, Jan. 2010.
"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.
"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.
"RFC 5940, Additional Cryptographic Message Syntax (CMS) Revocation Information Choices," S. Turner, R. Housley, Internet Engineering Task Force, Fremont, CA, Aug. 2010.
"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.
"RFC 5019, The Lightweight Online Certificate Status Protocol (OCSP) Profile for High-vol. Environments," A. Deacon, R. Hurst, Internet Engineering Task Force, Fremont, CA, Sep. 2007.

* cited by examiner

US 11,812,083 B2

TECHNIQUES FOR PUSHING PERSONALIZED STOREFRONT ADS USING DIGITAL TV

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in "ATSC 3.0 System" (A/300) for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, the ATSC 3.0 standard publication entitled "Physical Layer Protocol (A/322)" provides for delivering digital content in "physical layer pipes" or "PLPs". The standard further envisions using layered division multiplexing (LDM) as a PLP multiplexing scheme in which multiple PLPs share the same time and frequency resources but are multiplexed together with different power levels.

As further understood herein, present methods of store front sales are unidirectional, non-personalized, and bandwidth-limited. Present principles recognize that a retail outlet for example may broadcast personalized ads on an ATSC frequency with, for example, 3 dB stronger signal power to the locally received ATSC 3.0 broadcast for a communication link to a user's device and optionally using that devices Wi-Fi as a return link for personalized advertising. The local signal used to broadcast ads is thus stronger than the signal received in the ATSC 3.0 broadcast locally, by 3 dB or less (but still stronger) or by more than 3 dB, e.g., by four to six (4-6) dB or greater. So not only is the ATSC micro-broadcast hyper-local, but also hyper-personal, thus permitting targeted advertising with larger payload than other existing communication links, e.g., Wi-Fi or Bluetooth®.

Accordingly, a digital television system includes at least one transmitter assembly in a first retail outlet and in turn including at least one processor programmed with instructions to broadcast on a layered division multiplex (LDM) configured ATSC 3.0 RF channel, at least one advertisement pertaining to the first retail outlet that is receivable by at least a first mobile device as the first mobile device is proximate the first retail outlet.

In examples, the instructions may be executable to, responsive to a signal from the first mobile device, transmit 3 dB higher power than is locally received on the LDM configured channel to the first mobile device at least a first advertisement based at least on part on first user information.

In some implementations the LDM configured channel over which the first advertisement is sent to the first mobile device includes a first frequency and the LDM configured channel over which the second advertisement is sent to the second mobile device also includes the first frequency.

In example implementations the LDM configured channel includes a first frequency and the system further includes at least one transmitter assembly in a second retail outlet with at least one processor programmed with instructions to receive from the first mobile device a signal (Wi-Fi) comprising at least first user information, and responsive to the signal from the first mobile device, transmit an LDM configured channel on a second frequency to the first mobile device at least a third advertisement.

If desired, the instructions may be executable to transmit to the first mobile device an invitation to receive advertisements, and responsive to not receiving a consent signal from the first mobile device to receive advertisements, not send the first advertisement to the first mobile device. The instructions also may be executable to, responsive to receiving a consent signal from the first mobile device to receive advertisements, send the first advertisement to the first mobile device.

In another aspect, a digital television system includes at least one receiver configured to receive on a digital television link a signal from a first storefront computer proximate the receiver to tune to an indicated channel, and responsive to tuning to the indicated channel, receive on a layered division multiplex (LDM) configured indicated channel at least one advertisement.

In another aspect, in a digital television system, a method includes broadcasting, over a layered division multiplex (LDM) configured channel, a first advertisement receivable by at least a first mobile device proximate to a source of broadcast of the first advertisement. The method also includes broadcasting, over the LDM configured channel, a second advertisement receivable by at least a second mobile device proximate to the source of broadcast of the first advertisement.

The details of the present application, both as to its structure and operation, can best be understood in reference to the accompanying drawings, in which like reference numerals refer to like parts, and in which:

DETAILED DESCRIPTION

Figure 1:
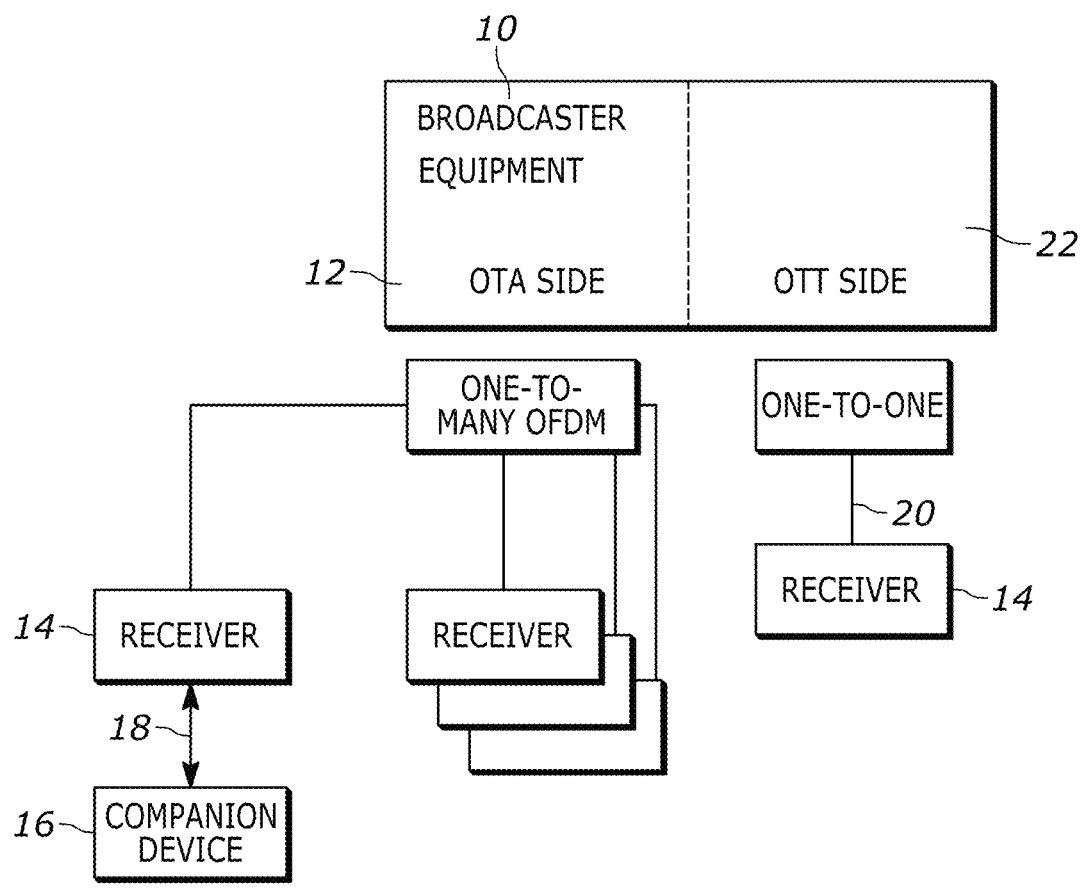
FIG. 1 is a block diagram of an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java/JavaScript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
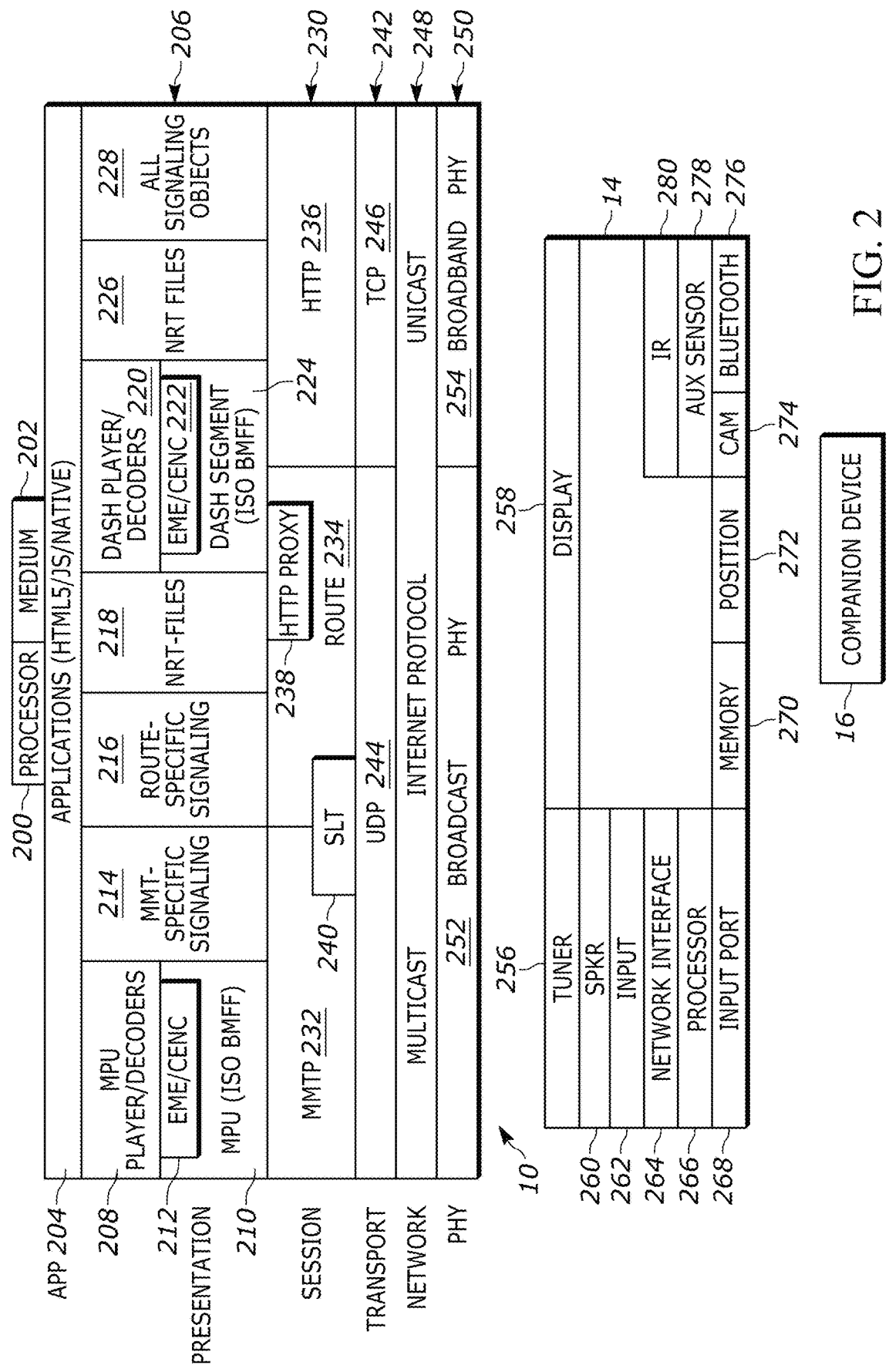
FIG. 2 is a block diagram showing components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/JavaScript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/ common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/ BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/ microphone for, e.g., entering audible commands to the receiver 14 to control the receiver 14. The example receiver 14 may further include one or more network interfaces 264 for communication over at least one network such as the Internet, a wireless area network (WAN), a local area network (LAN), a personal area network (PAN) etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
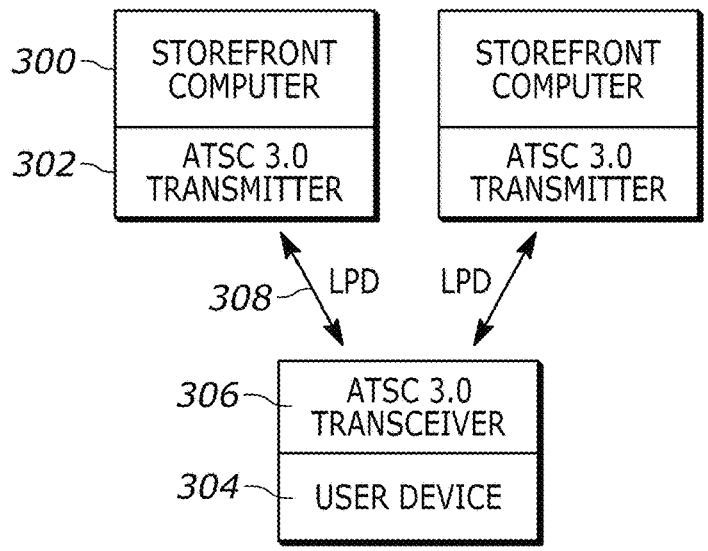
FIG. 3 is a block diagram of a store front system consistent with present principles.

Now referring to FIG. 3, one or more storefront computers 300 are shown that may be disposed in respective storefronts, e.g., retail outlets in a mall. Each storefront computer 300 may be associated with and control a respective digital television transceiver 302 such as an ATSC 3.0 broadcast transceiver that can transmit on ATSC 3.0 frequencies and specifically using layered division multiplexing (LDM, allowing superposition of power). The storefront computers 300 send personalized advertisements to users as they walk by holding respective mobile computing devices (MCD) 304 such as but not limited to cell phones with appropriate transceivers 306 that are configured to decode LDM. As disclosed further below, each MCD may execute an application that communicates the user ID and/or other user-related information to the storefront computers 300 via Wi-Fi or other means, if desired upon receipt of a generalized coupon with perhaps user permission required to send the personal ID. Or, the app on the phone may receive a generalized ad and tailor it to the user's profile. A message can pop up on then MCD 304 that local service available.

Figure 4:
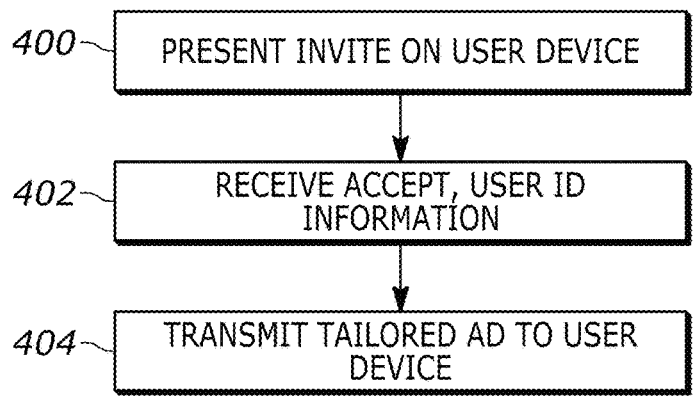
FIG. 4 is a flow chart of example logic consistent with present principles.

FIG. 4 illustrates. At block 400, an invitation to receive personalized advertisements may be sent from the storefront computer 300 to the MCD 304. Moving to block 402, assuming the user has input a command to accept personalized ads, the MCD 304 may be queried by the storefront computer or may automatically itself send to the storefront computer user information, such, by way of example, an identification of the user that can be used to access a database of user demographics, the user's demographics themselves, user preferences for ads or goods or services, etc. Using this user information, a generic ad is tailored/altered/selected at block 404 and sent to the MCD 304. Altering an ad may be something as simple as highlighting information in the ad that the user information indicates may be of interest to the particular user. Other heuristics may be applied and may be determined by a machine learning algorithm that correlates user preferences with ad features.

This communication can be over a LDM configured channel and readily available return paths like Wi-Fi and each storefront computer 300 may execute the logic of FIG. 4 as the user with MCD 304 walks in front of the store, e.g., within local proximity of the store using the same or different LDM configured frequencies and/or power levels.

Figure 5:
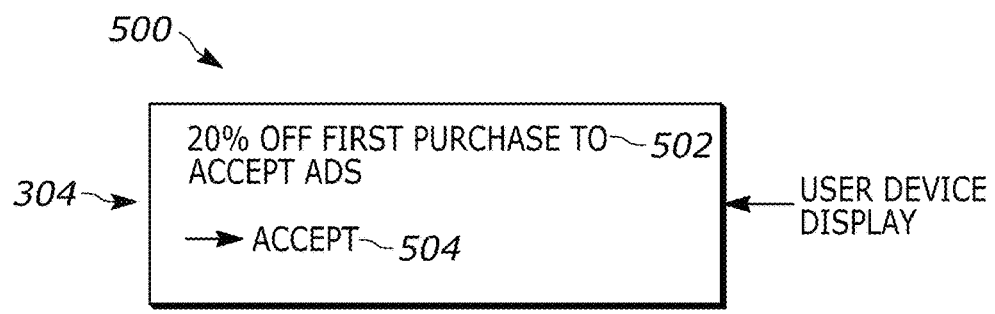
FIG. 5 is a screen shot of an example user interface of a mobile device consistent with present principles.

FIG. 5 illustrates a UI 500 that can be presented on the MCD 304. An invitation 502 to receive personalized advertisements, in this case in the form of a coupon offer for agreeing, is presented on the MCD 304 along with an accept selector 504 that may be selected to permit the logic of FIG. 4 to be executed.

Figure 6:
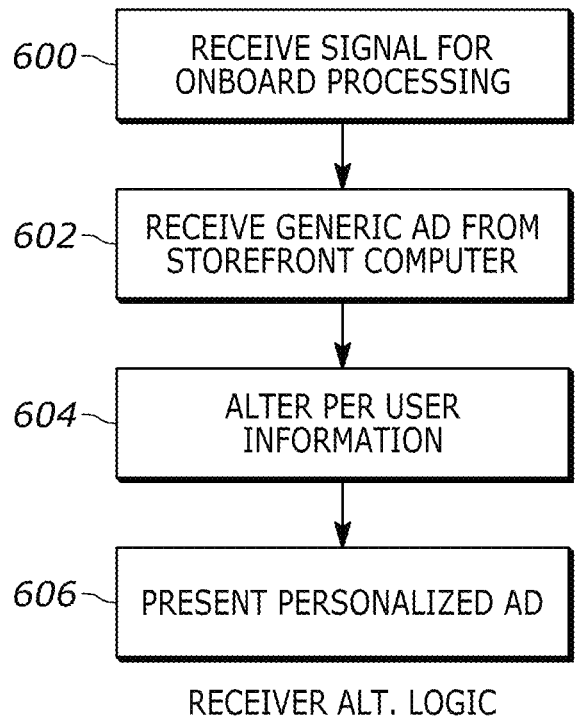
FIG. 6 is a flow chart of example logic.

FIG. 6 illustrates an alternate embodiment illustrating logic of an application ("app") that can be executed by the MCD 304 in which a signal is received at block 600 indicating that a generic ad is to be processed onboard the MCD 304. This signal may be generated by, e.g., the user refusing to accept the invitation 502 in FIG. 5, as but one example. Proceeding to block 602, the MCD 304 receives a generic ad from the storefront computer 300 responsive to being proximate the storefront and responsive to the storefront computer being signaled by the MCD to send the generic ad. Moving to block 604, the MCD 304 alters the generic ad in accordance with user information onboard the MCD 304 (e.g., stored in disk or received from the cloud) to render a personalized ad, which is presented at block 606.

The communications in FIG. 6 may be over an LDM configured channel consistent with principles above. In the receiver implementation of LDM of FIG. 6, it may be necessary to cancel out the Core Layer signal to decode the enhanced layer signal.

Figure 7:
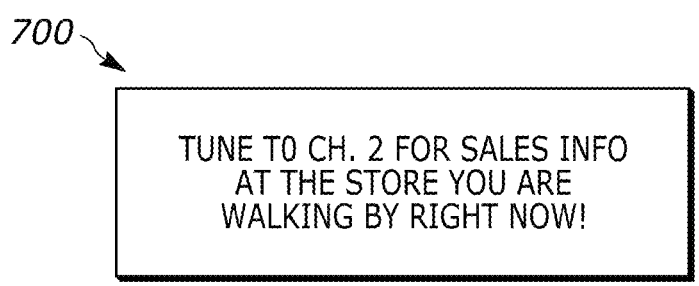
FIGS. 7 and 8 are screen shots of examples UIs that can be presented on mobile receivers.
Figure 8:
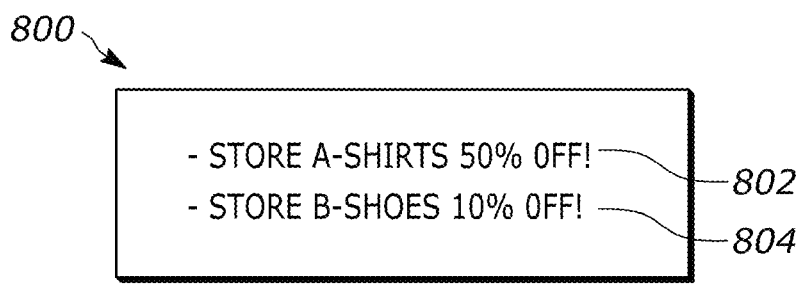

FIGS. 7 and 8 respectively illustrates UIs 700, 800 that may be sent to mobile receivers nearby a storefront or group of storefronts adjacent each other. FIG. 7 illustrates a solicitation to tune to a particular ATSC 3.0 channel on which the local LDM signals are being sent by a storefront transmitter. The storefront computer might first scan ATSC 3.0 channels to see which are available.

Should the user tune the receiver to the channel, a UI 800 may appear with one or more solicitations 802, 804 (in the example shown, one each for two adjacent storefronts) that can be viewed by the user. Communication need not be two-way as information sharing can be completed at the point of sale and the one-way transmission an contain information which the user receiver can filter for items of personal interest, so not only is the ATSC micro-broadcast hyper-local, but also hyper-personal, thus permitting targeted advertising.

Synchronization with emitted waveforms requires a receiver to first extract the ATSC 3.0 RF signal and find/capture the bootstrap symbols to know the a-priori information of bandwidth, sampling frequency, emissions timing, etc. This receiver can then determine which multiplexing option is being used, time division multiplexing, layered division multiplexing or frequency division multiplexing. If the scheme is LDM, then that channel can be used for hyper local advertisements.

LDM enhanced layer power can be overcome with a simple 3 dB higher power (or other dB higher power) than the received enhanced layer in that local area. The ATSC 3.0 receiver will pick up the hyper-local transmitter power information rather than the original enhanced layer information from the broadcaster, essentially overriding the information.

LDM is described in A/322:2019 Section 7.2.7.4 Layered Division Multiplexing (LDM). The start position and length of the enhanced layer should be signaled and then copied over for the hyper-local broadcast. Signaling for LDM is in Section 9.3 Syntax and Semantics for L1-Detail Data and the parameter L1D_plp_ldm_injection_level can be read for knowing how much more power is needed to override the broadcast signal. The parameter LD1_plp_TI_mode should be confirmed to be zero indicating Hybrid time interleaving. Also, L1D_plp_fec_block_start will indicate the start point of the framing for the enhanced layer PLP. Once these parameters are read, then the hyper local broadcast can duplicate service for that enhanced layer and provide service that over-rides the broadcast content.

ATSC 3.0 frequencies that are not using LDM may be used, although override of such multiplexing may be problematic.

Thus, a multicast broadcast system is advantageously disclosed that has high capacity delivery of data to all people nearby using mobile devices without network congestion. Present principles offer hyper local broadcasts for media essence/sales delivery information for one or several retailers.

In addition to use for store front advertising, present principles may be used to gather school attendance information and voting information.

It will be appreciated that whilst present principals have been described with reference to some example embodiments, these are not intended to be limiting, and that various alternative arrangements may be used to implement the subject matter claimed herein.

What is claimed is:

1. A digital television apparatus comprising:
at least one transmitter assembly in a first retail outlet and comprising:
at least one processor programmed with instructions to:
broadcast on a first digital television channel at least a first advertisement pertaining to the first retail outlet that is receivable by at least a first mobile device as the first mobile device is proximate the first retail outlet;
the first digital television channel comprising a first frequency, the system further comprising at least one transmitter assembly in a second retail outlet and comprising:
at least one processor programmed with instructions to:
receive from the first mobile device a signal comprising at least first user information; and
responsive to the signal from the first mobile device, transmit on a second digital television channel comprising a second frequency to the first mobile device at least a second advertisement.

2. The digital television apparatus of claim 1, wherein the instructions are executable to:
responsive to a signal from the first mobile device, transmit on the first digital television channel to the first mobile device at least the first advertisement based at least on part on first user information.

3. The digital television apparatus of claim 1, comprising the first mobile device.

4. The digital television apparatus of claim 1, wherein the digital television system comprises an advanced television systems committee (ATSC) 3.0 system.

5. The digital television apparatus of claim 1, wherein the first digital television channel over which the first advertisement is sent to the first mobile device comprises a first frequency and the second digital television channel over which the second advertisement is sent to a second mobile device comprises the first frequency.

6. The digital television apparatus of claim 1, wherein the digital television channel comprises a layered division multiplexing (LDM) channel.

7. The digital television apparatus of claim 1, wherein the instructions are executable to:
transmit to the first mobile device an invitation to receive advertisements;
responsive to not receiving a consent signal from the first mobile device to receive advertisements, not send the first advertisement to the first mobile device; and
responsive to receiving a consent signal from the first mobile device to receive advertisements, send the first advertisement to the first mobile device.

8. A digital television system comprising:
at least one receiver configured to:
receive on a digital television link a signal from a first storefront computer proximate the receiver to tune to an indicated channel;

responsive to tuning to the indicated channel, receive on a layered division multiplexing (LDM) configured indicated channel at least one advertisement, wherein the receiver is configured to:

receive on an LDM configured channel a signal from a second storefront computer proximate the receiver and comprising at least a second advertisement;

alter the second advertisement according to first user information in the receiver as the receiver is proximate the second retail outlet to render an altered ad; and present the altered ad on the receiver.

9. The digital television system of claim 8, wherein the digital television system comprises an advanced television systems committee (ATSC) 3.0 system.

10. The digital television system of claim 8, wherein the digital television link over which the first advertisement is sent to the receiver comprises a first frequency and the digital television link over which the second advertisement is sent comprises the first frequency.

11. The digital television system of claim 8, wherein the storefront computer is configured to:

transmit to the receiver an invitation to receive advertisements;

responsive to not receiving a consent signal from the receiver to receive advertisements, not send the first advertisement to the first device; and responsive to receiving a consent signal from the receiver to receive advertisements, send the first advertisement to the receiver.

12. The digital television system of claim 8, wherein the digital television link comprises a layered division multiplexing (LDM) configured channel.

13. A digital television system comprising:

at least one receiver configured to:

receive on a digital television link a signal from a first storefront computer proximate the receiver to tune to an indicated channel;

responsive to tuning to the indicated channel, receive on a layered division multiplexing (LDM) configured indicated channel at least one advertisement, wherein the at least one advertisement is a first advertisement and the digital television link over which the first advertisement is sent to the receiver comprises a first frequency and a digital television link over which a second advertisement is sent comprises a second frequency different from the first frequency.

14. A digital television system comprising:

at least one receiver configured to:

receive on a digital television link a signal from a first storefront computer proximate the receiver to tune to an indicated channel;

responsive to tuning to the indicated channel, receive on a layered division multiplexing (LDM) configured indicated channel at least one advertisement, wherein the digital television link comprises a first frequency and the system further comprises:

at least one transmitter assembly in a second retail outlet and comprising:

at least one processor programmed with instructions to:

receive from the receiver a signal comprising at least first user information; and responsive to the signal from the receiver, transmit on a digital television link comprising a second frequency to the receiver at least a second advertisement based at least on part on the first user information.

15. In a digital television system, a method comprising:

broadcasting, over a first digital television link comprising a first frequency, a first advertisement receivable by at least a first mobile device proximate to a source of broadcast of the first advertisement;

broadcasting, over a second digital television link comprising a second frequency different from the first frequency, a second advertisement receivable by at least the first mobile device or a second mobile device proximate to the source of broadcast of the first advertisement;

configuring the first digital television link over which the first advertisement is sent to the first mobile device to operate on the first frequency; and configuring the second digital television link over which the second advertisement is sent to the second mobile device to operate on the second frequency.

16. The method of claim 15, wherein the digital television system comprises an advanced television systems committee (ATSC) 3.0 system.

17. The method of claim 15, comprising:

establishing the first advertisement at least in part based on user information from the first mobile device.

18. The method of claim 15, comprising:

transmitting to the first mobile device an invitation to receive advertisements;

responsive to not receiving a consent signal from the first mobile device to receive advertisements, not sending the first advertisement to the first mobile device; and responsive to receiving a consent signal from the first mobile device to receive advertisements, sending the first advertisement to the first mobile device.

* * * * *